Oct. 14, 1969    M. TORRES    3,471,941
EDUCATIONAL DEVICES

Filed May 27, 1966    2 Sheets-Sheet 1

INVENTOR
Morris Torres

United States Patent Office 3,471,941
Patented Oct. 14, 1969

3,471,941
EDUCATIONAL DEVICES
Morris Torres, 1027 W. Riverside Way,
San Jose, Calif. 95125
Filed May 27, 1966, Ser. No. 554,644
Int. Cl. G09b 3/00
U.S. Cl. 35—9                                    7 Claims

ABSTRACT OF THE DISCLOSURE

A student operated study aid for answering a group of multiple choice questions by positioning adjacent switches. These switches are conditioned to indicate that the student's answer is in error by three additional switches which have been preset in accordance with the particular question series being answered. An error in any one of the student's answers is indicated by a red light actuated by a push button switch. Thus the student must answer all questions correctly before receiving an errorless indication.

---

Figure 1:
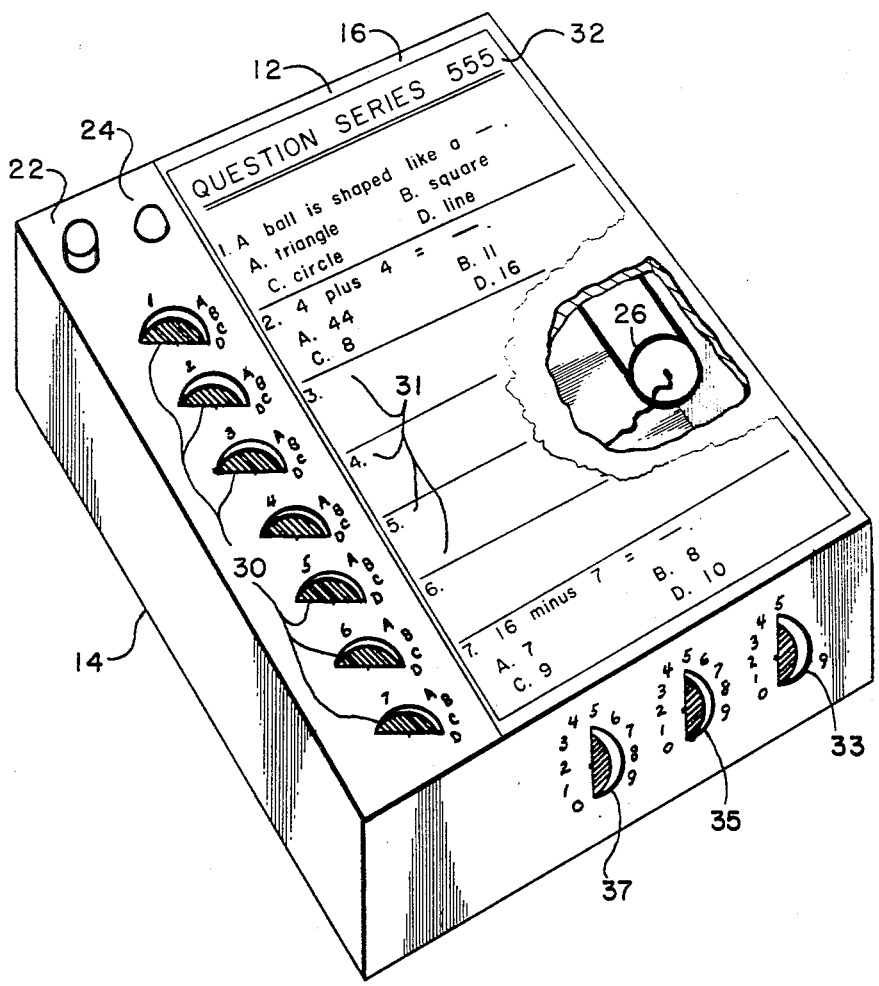

The present invention relates generally to educational devices and more particularly to a self-operated error indicating machine devised to facilitate self-education.

Many educational tests scoring devices have been proposed heretofore to assist in one way or another in teaching certain information. Such devices have proven unsatisfactory for the purpose of self-instruction for a number of reasons. One principal disadvantage stems from the fact that machines are designed to provide a measure of proficiency or scoring information with respect to student/operator answers to a group of questions. Such information tends to point out specific errors and does not force a student/operator to be fully confident of his comprehension of all information associated with a group of questions. Another disadvantage is that machines respond immediately and individually to correct or incorrect answers in sequence with the question group. Such machines circumvent the objectives of self-education and enable trial and error techniques to displace student/operator comprehension. Some machines provide such simple answer sequences as to be easily memorized by the student/operator in order to avoid the effort involved in the learning process. A further and significant disadvantage is related to the high cost of purchase, cost of maintenance, and cost of educational support material required for use with these machines. Electric circuits employed are complicated and expensive to manufacture and consequently the high purchase cost precludes general usage by students and teachers. Educational material associated with the use of these machines must be specially fabricated and is not economically practical or easily adaptable to general use by the classroom teacher.

To those versed in the art of education and its current problems of which an expansion in the diversity of knowledge and in the student population has placed an ever increasing demand on teaching efficiency and time, it is recognized that there has been and continues to be a need for an inexpensive device which will serve as an aid to the process of self-education. This invention is free from the above mentioned disadvantages and it introduces practical and novel features associated with a self-instruction device.

An object of the present invention is to provide an educational device operating according to a very different principle, and with additional desirable characteristics. More specifically, an object of this invention is to provide an error indication associated with student/operator answers to a plurality of questions without identifying either the source or number of errors involved.

A further object of this invention is to provide an educational device which provides the student/operator with an indication of error associated with answers to a plurality of questions without indicating which questions have been answered correctly.

An object of the present invention is to provide an inexpensive educational device which automatically requires the student/operator to review educational material associated with a plurality of questions until all questions may be answered correctly.

An object of the present invention is to provide an educational device which may be used in conjunction with educational material which is readily available to and easily prepared by the average classroom instructor. More specifically, an object of this invention is to facilitate the use, with minor modification and for the purpose of self-instruction, of existing test or question sets as educational support material for the self-instruction device.

An object of the present invention is to provide an educational device incorporating one multiple position answer selection switch for each question in a plurality of questions whereby the student/operator may establish a switch setting in correspondence with an answer selection for each question. More specifically, an object of this invention is to require the student/operator to preset each answer selection switch associated with each question in the question set and thereby to make an attempt to answer all questions correctly before receiving any indication of error associated with his answer selections.

A further object of this invention is to provide an educational device incorporating an error indicating lamp or signal which may be activated by appropriate means to inform the student/operator of an incorrect answer sequence selection associated with a plurality of questions.

An object of the present invention is to provide an educational device incorporating multiple contact control switches which establish by means of an appropriate electrical circuit a multitude of distinct and random correct answer sequences for the question answer which settings associated with the educational device. More specifically, an object of this invention is to provide an educational device whereby the student/operator may change the correct answer sequence switch settings to make these correspond to correct answer sequence of a variety of question sets without gaining knowledge of the specific correct answer sequences involved with the question sets.

The nature of this invention, and further features of novelty as well as further advantages will be better appreciated from the following detailed description of a preferred illustrative embodiment in which reference is made to the accompanying drawings forming a part of the disclosure.

Figure 2:
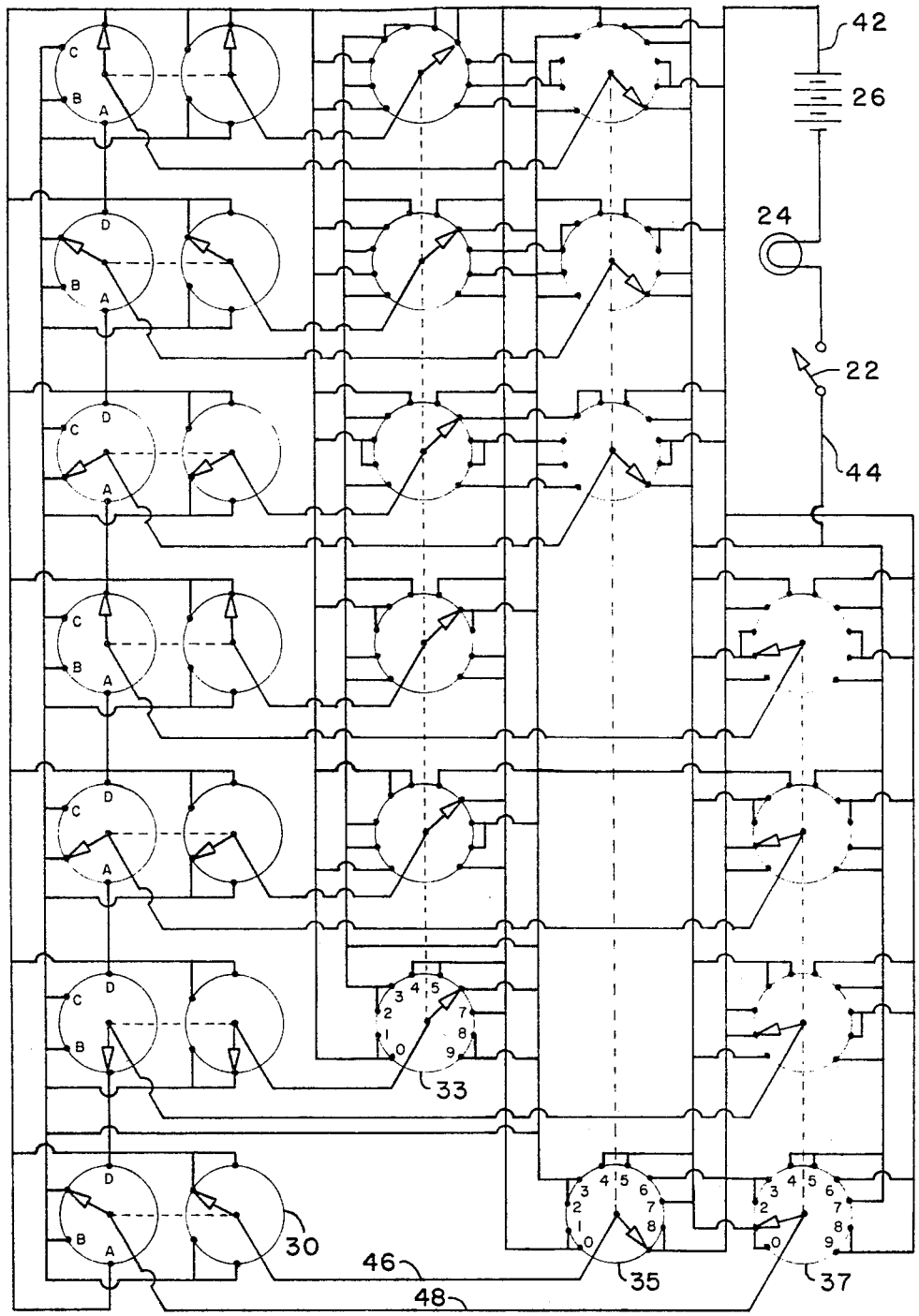

In the accompanying drawings illustrating such embodiment: FIGURE 1 is a front perspective view of the improved educational device showing the housing and operator controlled features. FIGURE 2 is an electrical circuit diagram of the improved educational device.

In the drawing of FIGURE 1 a housing 14 is shown which contains electrical circuits and components suitably connected. A space 12 on top of the housing is provided for placement of a sheet of paper 16 which contains seven multiple choice questions 31 and a question series identification number 32. Near the left margin of the sheet of paper and associated with each of the seven questions are seven answer selection switches 30. Each answer selection switch has four separate answer selection positions each of which corresponds to a specific answer choice associated with a multiple choice question on the sheet of paper.

To facilitate a variation in the correct answer sequences from one question set to another and for the purpose of making the correct answer switch settings correspond to the correct answer sequences associated with the educational support material on the sheet of paper, three ten-position question series selector switches 33, 35, and 37 on the front of the housing are connected by suitable electrical circuits to control and vary the correct answer switch positions. In this embodiment of the invention, the question series selector switches may be positioned in any one of one-thousand distinct settings corresponding to numbers from zero to nine-hundred-ninety-nine and providing one-thousand distinct correct answer sequences for the answer selection switches 30.

A push-button 22, an error indicating lamp 24, and a battery 26 are suitably connected to the answer selection switches 30 and the question series selector switches 33, 35, and 37. In operation of the improved educational device the student/operator is given a sheet of paper containing seven multiple choice questions each of which has four possible answer choices. The student/operator must place the sheet of paper 16 in the space 12 provided on top of the housing 14. The student/operator must then set the question series selector switches 33, 35, and 37 to correspond to the question series number 32 contained on the sheet of paper. This action in conjunction with the electrical circuit of the improved educational device makes the correct answer switch settings correspond to the correct answer sequence associated with the multiple choice questions on the sheet of paper. The student/operator then makes an attempt to answer all questions correctly and to establish the correct settings of the answer selection switches 30. A test to determine whether any error exists in the student/operator answer sequence choice and corresponding answer switch settings may be made by depressing the push-button 22. In the event all questions have been answered correctly the indicator lamp 24 will not signal an error when the push-button is depressed. The student/operator is informed of any error associated with his settings of the answer selection switches by a signal from the lamp 24 when the push-button 22 is depressed. In the event of error, the student/operator must review material associated with the set of questions and make his own decisions as to which questions have been answered correctly and which questions have been not answered correctly. By this means the student/operator is forced to be fully confident of all his answer selections associated with the set of questions and any material associated with questions which are not clearly answered correctly must be reviewed.

In the electrical circuit of FIGURE 2 the push button 22, the error indicating lamp 24, and the battery 26 are connected in series. It is to be observed that when and only when electrical connection between the wires 42 and 44 is established will a depression of the push-button 22 cause the indicator lamp 24 to operate. In the circuit of FIGURE 2 electrical connection between the wires 42 and 44 is effected unless the answer switch settings 30 correspond to the correct answer sequence associated with the question series selector switches 33, 35, and 37. In the drawing, the question series selector switches are electrically positioned to correspond to question series number six-hundred-ninety-one. The correct answer switch settings for this question series setting corresponds to settings of the seven answer switches 30 at positions corresponding to an answer sequence choice of D, A, D, A, C, A, and A from top to bottom in the circuit of FIGURE 2. Each distinct setting of the question series selector switches 33, 35, and 37 provides a unique and distinct correct answer sequence setting for the seven answer switches.

Each of the seven answer selection switches 30 serves to connect two wires 46 and 48 in a binary coded manner to the terminals 42 and 44. A total of fourteen such wires 46 and 48, two for each answer selection switch, are uniquely connected to the terminals 42 and 44 in a sequence which corresponds to the answer setting sequence associated with the seven answer selection switches. Each of the fourteen signal wires 46 and 48 are also connected to one of the terminals 42 and 44 by means of a switch section on one of the question series selector switches 33, 35, or 37. The switch sections associated with the question series selector switches provide a circuit which connects the fourteen signal lines 46 and 48 in a unique manner to the terminals 42 and 44 for each distinct setting of the question series selector switches. When and only when all connections of the fourteen signal lines 46 and 48 made by the seven answer selection switches 30 and the question series selector switches 33, 35, and 37 to the terminals 42 and 44 correspond in sequence will the circuit between terminals 42 and 44 be open and prevent activation of the signal light 24 when the push-button 22 is depressed. Such a condition is a result of an answer switch setting sequence which corresponds to the correct answer sequence associated with the settings of the three question series selector switches. In the event the answer switch setting sequence does not correspond to the correct answer sequence associated with the settings of the three question series selector switches, at least one of the fourteen signal lines 46 and 48 will effect a connection between the terminals 42 and 44 and cause an error indication when the push-button is depressed.

In the practical embodiment, the device employs seven answer selection switches and three ten position question series selector switches. Naturally, the number of switches involved and the number of positions associated with each switch are illustrative as is the specific answer sequence associated with each setting of the question series selector switches. The machine and circuit can readily be designed for other practical configurations employing more or less answer selection switches having more or less number of answer settings and with more or less number of question series selector switches having more or less number of positions.

Further modifications and varied applications of the foregoing invention will occur to those skilled in the art, and accordingly the appended claims should be construed broadly as is consistent with the spirit and scope of the present invention.

What is claimed is:

1. An educational device to facilitate self-education and having a plurality of multiple position answer selection switches designed to be positioned in correspondence to student/operator answer selections to a plurality of questions, a plurality of multiple position question series selector switches for together establishing one of a plurality of possible correct answer sequence settings for the answer selection switches, means for comparing the position of each of said answer selection switches with a correct position as part of said corresponding answer sequence setting and means for indicating a lack of comparison with respect to said entire answer sequence in response to any one of said answer switches having a position not corresponding to said answer sequence setting.

2. An educational device as in claim 1 in which said indicating means includes a light source which is activated to indicate a lack of comparison.

3. An educational device as in claim 2 together with switch means for selectively allowing said student/operator to condition said light source for operation.

4. An educational device as in claim 3 together with battery means for supplying energy to said light source.

5. An educational device as in claim 1 together with electrical power means coupled to said indicating means through both said answer selection switches and said question series selector switches.

6. An educational device as in claim 5 in which each of said answer selector switches include two signal paths extending to said question series switches and in which said electrical power means is coupled to said indicating means through said two signal paths for positions of an answer selector switch which do not compare with said corresponding answer sequence setting.

7. An educational device to facilitate self-education and having a plurality of multiple position answer selection switches designed to be positioned in correspondence to student/operator answer selections to a plurality of questions, a plurality of multiple position question series selector switches for establishing a plurality of correct answer sequence settings for the answer selection switches, a means to indicate any error associated with student/operator answer switch settings corresponding to his answer choice sequence, a source of electrical power, said plurality of multiple position question series selector switches connecting said plurality of multiple position answer selection switches to said source of power and to said error indicating means by means of electrical circuitry, selector means for conditioning said plurality of question selector switches to render said error indicating means inoperative when said plurality of answer selection switches have been positioned in accordance with said correct answer sequence of settings.

References Cited

UNITED STATES PATENTS

| | | | |
|---|---|---|---|
| 2,877,568 | 3/1959 | Besnard et al. | 35—9 |
| 2,983,053 | 5/1961 | Bartholomew et al. | 35—9 |
| 3,327,405 | 6/1967 | Ingeneri | 35—9 |

EUGENE CAPOZIO, Primary Examiner

WALTER W. NIELSEN, Assistant Examiner